UNITED STATES PATENT OFFICE.

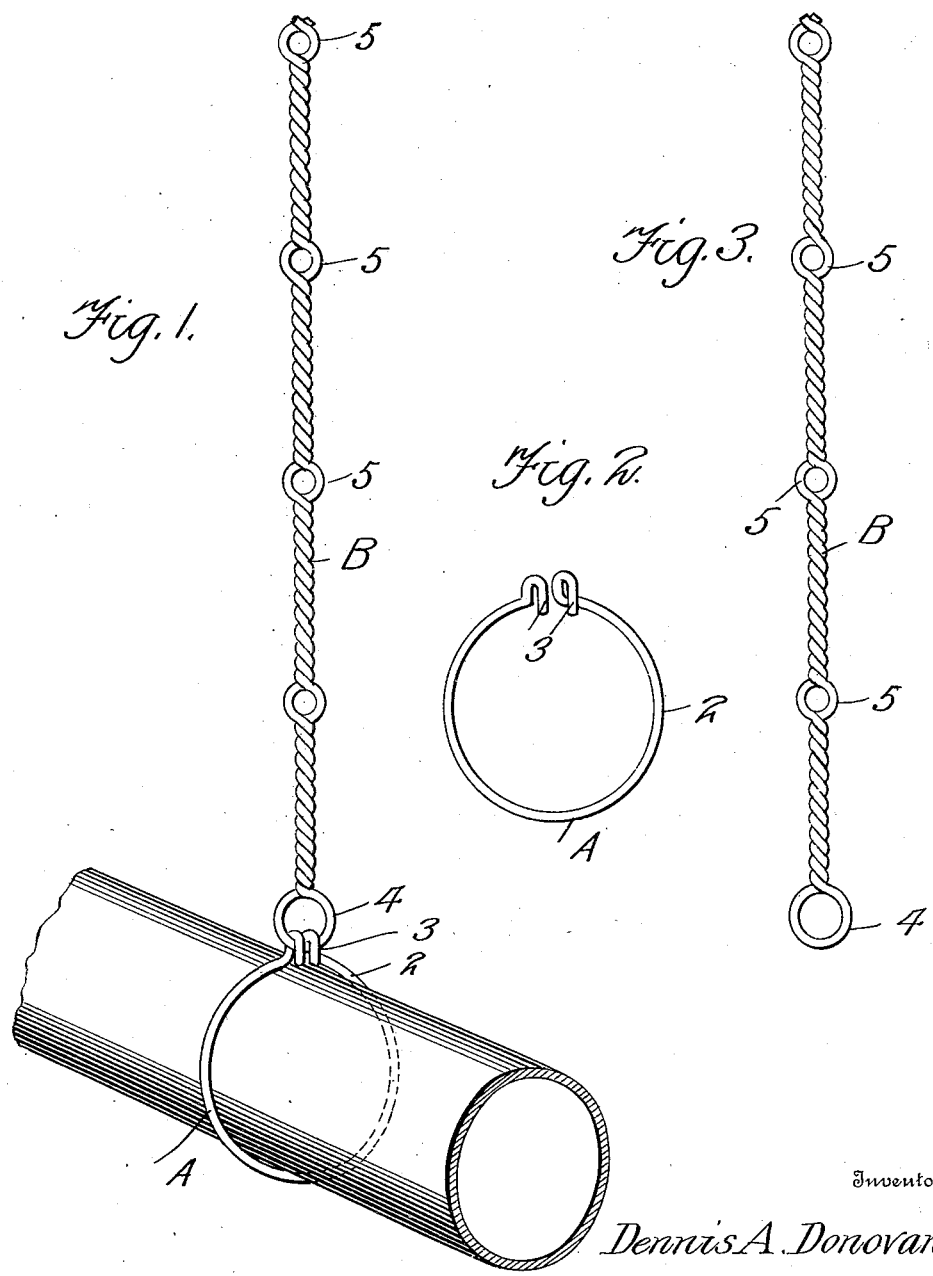

DENNIS ALOYSIOUS DONOVAN, OF AUBURN, NEW YORK.

PIPE-HANGER.

No. 918,021.     Specification of Letters Patent.     Patented April 13, 1909.

Application filed April 20, 1907. Serial No. 369,225.

*To all whom it may concern:*

Be it known that I, DENNIS A. DONOVAN, a citizen of the United States, residing at Auburn, in the county of Cayuga and State of New York, have invented certain new and useful Improvements in Pipe-Hangers, of which the following is a specification.

My invention relates to pipe hangers, and broadly and generally speaking, it consists of a supporting member and a pipe embracing member.

One object of the invention is to provide a pipe hanger wherein the pipe embracing member may be readily and quickly applied to and removed from pipes of different diameters, and attached to and detached from the supporting member.

Another object of the invention is to provide a pipe hanger wherein the supporting member is capable of supporting a pipe at varying distances from the object to which it is secured.

A still further object of the invention is to provide a pipe hanger which is simple, durable and efficient, and which may be manufactured and sold at a comparatively low cost.

With the above and other objects in view, the invention consists in the construction, combination and arrangement of parts hereinafter fully described, claimed and illustrated in the accompanying drawing, in which:

Figure 1 is a perspective view of a pipe hanger constructed in accordance with my invention. Fig. 2 is a detail view of the pipe embracing member, and Fig. 3 is a detail view of the supporting member.

Referring to the drawing by reference characters, A designates the pipe embracing member, and B the supporting member. The pipe embracing member is preferably constructed of a single strand of wire or other flexible element which is bent to provide a split annular body 2 and hooks 3, said hooks being disposed above and in advance of the plane of the body. As the body 2 is split and as the hooks 3 are disposed above and in advance of the plane of the body, it should be apparent that the pipe embracing member may be readily applied to and removed from a pipe, and as readily attached to and disengaged from the supporting member. The supporting member is also preferably constructed of a single strand of wire or other flexible element, which is bent at a point intermediate its length, and the strands thus formed twisted about each other. The strands are intertwisted to provide a loop 4 into which the hooks 3 of the pipe embracing member are inserted, and eyes 5 which are distributed in spaced relation throughout the length of the supporting member, the intertwisted portions of the strands forming stiffening sections.

In practice, the hanger is secured to a suitable support by means of nails or other fastening means, passed through one of the eyes 5 and engaged with the support, after which the pipe embracing member is applied to the pipe and the hooks 3 engaged with the loop 4. In view of the fact that the supporting member is provided with a number of eyes 5 arranged in spaced relation throughout the length thereof, said supporting member may be secured to a support to retain the pipe at varying distances therefrom.

As the invention may be constructed of two strands of wire, it is exceedingly simple, and may be manufactured and sold at a comparatively low cost.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages thereof.

Having fully described and illustrated my invention, what I claim as new is:

1. A pipe hanger comprising a supporting member constructed of a single length of material bent at a point intermediate its length, the strands thus formed being intertwisted to provide a terminal loop, a plurality of stiffening sections, and a plurality of eyes spaced by said sections; and a pipe embracing member constructed of a single element having its terminals formed to provide hooks adapted to engage the terminal loop of the supporting member.

2. A pipe hanger comprising a straight supporting member constructed of a single length of wire bent at a point intermediate its length, the strands thus formed being intertwisted to provide a terminal loop, a plurality of stiffening sections, and a plurality of eyes spaced by the stiffening sections; and a pipe embracing member constructed of a single strand of wire bent to provide a split annular body and having its terminals formed to provide downwardly opening hooks adapted to engage the terminal loop of the supporting member.

In testimony whereof I affix my signature, in presence of two witnesses.

DENNIS ALOYSIOUS DONOVAN.

Witnesses:
    FRANK COLLINS,
    PORTER BEARDSLEY.